United States Patent [19]

Rogg

[11] 4,368,646
[45] Jan. 18, 1983

[54] FLOW METER FOR LIQUID OR GASEOUS MEDIA

[75] Inventor: Werner Rogg, Schwenningen, Fed. Rep. of Germany

[73] Assignee: Irion & Vosseler, Zählerfabrik, Schwenningen, Fed. Rep. of Germany

[21] Appl. No.: 241,717

[22] Filed: Mar. 9, 1981

[30] Foreign Application Priority Data

Mar. 18, 1980 [DE] Fed. Rep. of Germany ....... 3010282
Oct. 25, 1980 [DE] Fed. Rep. of Germany ....... 3040320

[51] Int. Cl.$^3$ .......................... G01F 1/24; G01F 1/28
[52] U.S. Cl. .............................. 73/861.55; 73/861.54; 73/861.57
[58] Field of Search ........... 73/861.55, 861.54, 861.58, 73/861.57

[56] References Cited

U.S. PATENT DOCUMENTS

| | | | |
|---|---|---|---|
| 2,640,356 | 6/1953 | Shannon | 73/861.54 |
| 2,647,402 | 8/1953 | Ibbott | 73/861.58 |
| 2,749,742 | 6/1956 | Aller | 73/861.55 |
| 2,800,019 | 7/1957 | Rumble | 73/861.57 |
| 3,287,971 | 11/1966 | Bahniuk | 73/861.58 |
| 3,931,737 | 1/1976 | Conkling et al. | 73/861.55 |
| 4,194,394 | 3/1980 | Bartholomaus | 73/861.54 |
| 4,304,136 | 12/1981 | McCabe et al. | 73/861.54 |

FOREIGN PATENT DOCUMENTS 1218944 1/1971 United Kingdom ............. 73/861.54

Primary Examiner—Howard A. Birmiel
Attorney, Agent, or Firm—McAulay, Fields, Fisher, Goldstein & Nissen

[57] ABSTRACT

A flow-through meter for liquid or gaseous media including a housing through which the medium flows. A floating body is disposed within the housing for movement under the influence of a lifting force produced by an increased flow of the medium through the housing. The floating body is rigidly connected to a weight body of ferromagnetic material by a connecting rod which serves to locate the weight body in the field of an induction coil mounted within the housing. A restoring biasing member is located between the weight body and an internal collar abutment of the housing, and exerts a force on the weight body counteracting the lifting force. The meter further includes a damping piston located between the housing collar abutment and the restoring spring, and disposed for axial movement lengthwise of the connecting rod. The arrangement is such that load influences or forces resulting from impacts or pulsations of the medium due to vehicle movement are compensated by the damping piston to eliminate or substantially reduce false measurements in the flow through quantity otherwise due to such external influences. A further damping valve is provided between the floating body and the discharge end of the housing to prevent measuring errors due to sudden changes in the flow through quantity resulting from discontinuous fuel regulation.

13 Claims, 1 Drawing Figure

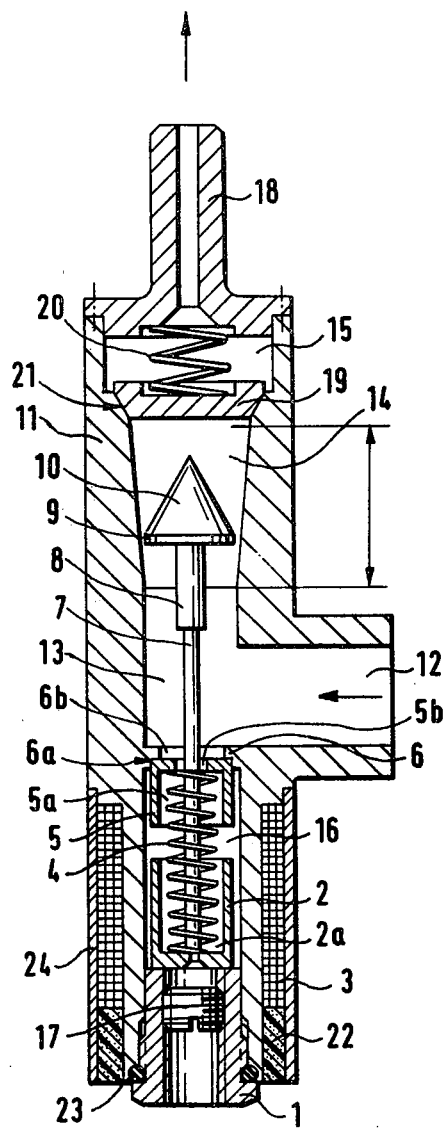

FLOW METER FOR LIQUID OR GASEOUS MEDIA

BACKGROUND OF THE INVENTION AND DESCRIPTION OF THE PRIOR ART

The invention relates to a flow meter for liquid or gaseous media. The meter includes a housing having an inlet and an outlet through which the medium flows. A flow measuring device, preferably in the form of a floating body, is positioned within the housing in the flowing medium, and is shiftable or disposed for movement from an initial position to a displaced position under the influence of the lifting force produced by an increased flow of the medium through the housing. The floating body is rigidly connected via a rod with a weight body which is of ferromagnetic material, and which body is located in the field of an induction coil mounted within the housing. In this flow meter, the floating body is vertically arranged in a conical tube or passage of the housing containing the flowing medium and assumes a certain position dependent upon the influence of lifting forces generated by the flow through quantity of the medium. The lifting forces are counteracted by gravity and possibly by a spring force, or by the sum formed by both these forces. The position of the lifting body, which is dependent upon the flow through quantity, may be determined by means of the stationary housing mounted induction coil in known manner.

Such flow through quantity meters are known. An essential advantage of these meters, operating according to the floating body principle, resides in that for the measurement of liquid media they can be so dimensioned and adjusted that the gaseous component contained in the liquid, in the form of bubbles, is not included in the measured value, or only to a negligible extent. This is in contradistinction to other measuring methods using rotors.

For this reason, and because of the relatively simple mechanical construction, it was considered to use flow through meters operating according to the floating body principle in motor vehicles to determine the fuel requirements. In this type of application, additional problems occur because the measuring device is subjected to very different and fluctuating movements and position changes due to the movement of the vehicle.

Largely independent of position changes of the measuring device due to vehicle movement, is the operation of such flow through meters in which the lifting force acting upon the floating body is essentially counteracted by a spring force. A quantity measuring device of this type has also become known in which both a weight, as well as a restoring spring, act to produce the counter force. In such instances, the spring is located between the weight body and an internal collar abutment of the housing. Such an arrangement reacts particularly sensitively to fluctuations in relatively small flow through quantities, such as are to be indicated for the use of fuel in motor vehicle engines.

A further heretofore unsolved problem resides in this type of application in that the fluid flow of medium to be measured has shock waves superimposed on the measuring device, such as for example resulting from movement of the overall system or, from operation of the fuel pump, or from gas bubble formation resulting due to temperture increases. These external influences cause an undesirable deflection of the floating body and thus falsify the measurement of the flow meter.

The purpose of the invention is to so compensate the above described external influences that the measuring errors resulting therefrom are avoided, or at least reduced as far as possible.

A further problem is the difficulty encountered in making fine adjustments and/or linearizing of the measuring device during manufacture and assembly of the meter.

These and other problems are overcome by the features of the present invention as hereinafter described.

SUMMARY OF THE INVENTION

The flow-through meter of the present invention includes a damping piston located between the housing collar abutment and the restoring spring. The piston has an opening through which extends the connecting rod to permit axial movement of the piston, lengthwise of the rod, from a rest position to a displaced position. The piston and the floating body each have an effective cross section surface of approximately the same area subjected to forces exerted by the medium, and the medium flows into the housing through the housing inlet which is located between the floating body and the damping piston.

With this arrangement all load influences or forces resulting from impacts or pulsations of the medium to be measured are compensated for by the damping piston. The inventively proposed damping piston is so dimensioned and arranged that, under the influence of a blower or impact or pulsation imparted to the medium, it is deflected in the same measure but in the opposite direction from the floating body. This results in an impulse-like increase of the restoring force produced by the spring so that the floating body cannot follow the flow transmitted to it by such external influences.

According to a further proposal of the invention, the preferably helically configurated restoring spring is so dimensioned that it presses the damping piston against the housing mounted collar abutment when the floating body is in its initial position. In other words, the force exerted by the spring on the damping piston when the floating body is in its initial position corresponds to the weight of the damping piston. On deflection of the floating body due to an increase of the flow through quantity, the movement change is counteracted by the inertia of the total floating body system composed of the floating body, connecting rod, counterweight, and the force of the restoring spring. If, however, the system receives an impact, then the inertia countering the movement of the floating body is increased by the mass represented by the damping piston. This measure leads to a stabilization of the floating body for the following reason. If the flow meter receives, e.g. due to the vehicle movement, an impact in flow direction, then the flow through cross section between the floating body and the cone or passage of the flow meter housing is reduced. Due to this constriction, and increased eddying of the medium takes place in the region of the floating body which leads to an increase of the lifting forces acting upon the floating body. These increased lifting forces would falsely lead to a measurement simulating an increased flow. These additional lifting forces are also compensated with the damping piston suggested according to the invention.

As already mentioned in the introductory portion of the specification, the use of the restoring force leads to a largely position-independent operation of the flow meter. The spring produces a restoring force which counteracts the lifting force even in horizontal position. This spring, also, can center the floating body system located in the flowing medium if, namely, as is further suggested, the weight body and the damping piston between which the spring is stressed, have receivers or recesses which fix the same in its position and center it. This is realized in a simple manner in that the damping piston and the weight body are of cup shaped configuration with the open ends thereof defining oppositely facing recesses for receiving and centering the spring therebetween.

A further proposal according to the invention also serves for the positional centering of the system, according to which the housing collar abutment has an opening through which extends the connecting rod. The collar abutment also has a receiver or recessed lip which receives and centers the damping piston in its rest position. The cutouts or openings in the collar abutment and the damping piston, through which the connecting rod is extended between the floating body and the weight body, being substantially greater in size than the diameter of the rod so that contact is avoided between the connecting rod and the collar and the damping piston, respectively, thereby to eliminate or minimize losses due to friction.

The floating body itself is centered by the medium flowing about it if it is of rotationally symmetrical construction. Heretofore, the effective part of the floating body was either configurated in the form of a circular plate or in the form of a frustocone with a cross section which increased in the direction of flow. Examinations have shown that, in both types of constructions, self-oscillations may occur. These are surprisingly avoided according to a further characteristic of the present invention if the floating body is configurated in the form of a cone, the base of which forms an impact plate which is located forwardly in flow direction, and which cone tapers in the direction of flow. In this manner, the marginal eddies forming along the edge of the floating body separate more quickly from the floating body.

A further stabilizing effect is achieved if the conical floating body has, on the side facing towards the flow, a cylindrical plate-like impact plate preferably having a thickness in the order of a few tenths if it has a diameter of 10–20 millimeters. This, on the one hand, assures a viscosity independence in the starting measuring range, and on the other hand, assures an indication stability in the end measuring range. A further stabilization can finally be achieved in that the above discussed conical floating body has an elongated cylindrical portion located at its side facing forwardly in flow direction, that is, interconnecting the base portion of the floating body with the connecting rod. The construction of the cylindrical portion is such that its length is substantially greater than its diameter.

The above discussed damping piston arrangement is rather well suited for compensating the measuring errors caused by vehicle movements. However, this arrangement cannot compensate for errors resulting from discontinuous fuel regulation, such as when stepping on the gas pedal or removing one's foot from the gas pedal. For example, when stepping on the gas, a pressure drop occurs in the flow path behind the floating body due to the sudden outflow of the fuel, which leads to an incorrect flow indication. In order to eliminate or at least to reduce the problem leading to this incorrect indication, it is proposed according to a further characteristic of the invention to arrange a pressure retaining valve in the flow path behind the floating body. This pressure retaining valve follows the pressure fluctuations which do not correspond to a flow through quantity change, and thus dampens their influence upon the floating body.

In the present invention, the housing includes a valve seat and a discharge nipple adjacent its discharge end. Suitable as a pressure retaining valve in a flow meter with a floating body is a valve plate disposed for movement from a seated position to a displaced position relative to the valve seat. A helical spring is disposed between the valve plate and discharge nipple and exerts a force on the plate in the direction of the valve seat and counter to the fluid flow.

The use of such a pressure retaining valve in other flow meters operating according to a different principle, for example in those having rotating flow indicators, is also possible and within the teaching of the invention.

To solve the partial problem of fine adjustment and linearizing of the measuring device, a further proposal according to the invention suggests to influence the characteristic line of the measuring device by varying the induction flow. For this purpose, an adjusting body of ferromagnetic material is adjustably positioned within the housing in the region of the weight body, and which body dips into the induction coil to influence or vary the magnetic field within the coil.

Constructive details of the invention are subsequently described based upon the exemplary embodiment which is shown in the drawing.

BRIEF DESCRIPTION OF THE DRAWING

The FIGURE in the drawing is an elevational view, in section, taken through a flow meter constructed according to the invention.

DESCRIPTION OF THE PREFERRED EMBODIMENT

The flow through quantity meter illustrated in the drawing includes a housing 11 having an inlet 12, internal chambers 13 and 14, and an outlet 15. In the present illustration, the medium to be measured is a liquid fuel, preferably gasoline, which passes through the housing via inlet 12 and outlet 15. The chambers 13 and 14 serve for measuring purposes.

Shiftable relative to the measuring path is the floating body which is composed of an elongated cylindrical projection 8, a flat cylinder plate-like impact plate 9 and a cone 10 which tapers in flow direction. This floating body 8, 9, 10 is connected via a rod 7 with the weight body 2 which is located in the lower cylindrical part 16 of the housing, and which is also flowed about by medium. The lower end of the housing is closed by a screw 1 which seals by means of an O-ring 23.

The weight body 2 produces the counter force against the lifting force acting upon the lifting body 8, 9, 10. This counter force is aided by the restoring force of a helical spring 4 which is tensioned between the counter weight 2 and a damping piston 5 which itself abuts against an annular collar 6 of the housing. The collar 6 is provided, on its side facing towards the damping piston 5, with a receiver or recess lip 6a by means of which the damping piston 5 is centered in its rest position. The helical spring 4, for its part, is mounted and centered by means of the receiver or recess 5a of the damping piston 5 and on the other hand by the receiver or recess 2a of the weight body 2. This arrangement of the spring 4 within the hollow spaces 2a and 5a leads to a significant reduction of the longitudinal dimension of the device.

Since the floating body 8, 9, 10 is itself centered by the flow, the entire construction represented by the weight body 2, the floating body 8, 9, 10 and the connecting rod 7 retain their center position even during inclinations of the housing 11, with only slight deviations. To avoid arrests or blockages in the movement of the floating body, the cutouts or openings 5b in the damping piston 5 and 6b in the abutment collar 6 are made clearly larger than the cross section of the connecting rod 7.

The weight body 2 consists of ferromagnetic material and forms a shiftable core within an induction coil 3 mounted within the housing. The inductivity change due to the shifting of the weight body 2 consittutes a measure for the lifting forces acting upon the floating body 8, 9, 10 and, thus, for the flow through quantity. The measuring of the inductivity change is effected with known per se circuits, for example, with an AC operated measuring bridge in one branch of which the induction coil 3 is arranged.

Deviations occurring in the electrical measuring circuit can be compensated for by means of an adjusting screw or member 17 of magnetic material which can be threaded, more or less, into the magnetic internal field of the induction coil 3. For this purpose, the adjusting screw 17 is inserted into the closure screw 1. The arrangement is such that the adjusting screw is in alignment with the weight body.

To eliminate the influence of stray fields, the induction coil 3 is wound or pushed onto a tapered extension of the housing 11 that consists of non-ferromagnetic material, e.g. plastic, brass, Va-steel or aluminum, and covered by a shielding tube 24 consisting of metal. As shown in the drawing, the induction coil 3 is sandwiched between the housing extension and the shielding tube, and terminates short of the ends thereof to form an open annular space 22 between the extension and the shielding member. For positional securement, the outer annular space 22 is filled with an electrically insulating casting mass.

An essential element according to the present invention is the damping piston 5, the operation of which has already been described in detail in the introduction to the description. If pressure pulses occur in the chamber 13, e.g. due to pulsations, the impact body 8, 9, 10 receives an additional force in flow direction so that the incremental displacement of the floating body would simulate an increased flow. However, since a force also acts in the opposite direction upon the damping piston, the cross section of which corresponds approximately to the cross section of the floating body, the damping piston also is deflected so that the restoring force of the now more strongly prestressed spring 4 is increased. This increase of the restoring force compensates for the incremental increase of the lifting force acting upon the floating body.

Furthermore, the damping piston 5, together with the conically configurated floating body section 10, compensates for eddy forces acting upon the floating body and which results from impacts transmitted to the housing 11.

While the damping piston 5 compensates measuring errors which are a result of the vehicle movement, there is further provided a pressure retaining valve that serves to prevent measuring errors which are a result of sudden changes in the flow through quantity. This pressure retaining valve is located in the flow path behind the conical measuring path 14, within which the floating body 10 is shiftably located, and ahead of the housing outlet side 15. In the illustrated embodiment, the pressure retaining valve is composed of a valve plate 19 which is pressed under the influence of the helical spring 20 against the conical valve seat 21 at the outlet side of the housing 11. The spring is supported against the inner side of the connecting nipple 18 which is threaded onto the housing end. The conical valve seat effects a symmetrical pressure distribution for centering the valve plate 19 which is also provided with a conical circumferential surface.

Under the influence of the flow pressure which effects movement of the floating body 10, the valve plate 19 also is lifted against the force of the spring 20. If suddenly at the outlet side, e.g. when stepping on the gas, more liquid is withdrawn, then the floating body 10 would be aspirated if the pressure holding valve were not present, and its displaced position would simulate a larger flow through quantity than is in accord with the actual momentary flow through quantity. To prevent this wrong indication or at least to reduce the measuring error, the pressure holding valve is provided between the floating body 10 and the outlet nipple 18, the valve plate 19 of which is initially aspirated under the effect of the underpressure and thus compensates the underpressure-caused error without such error being able to effect an additional positional change of the floating body 10.

The valve operates in a corresponding manner in case of a sudden reduction of the quantity of fluid withdrawn at the outlet side, which leads to a brief overpressure. This overpressure shifts the valve plate 19 counter to the flow direction and prevents the restoring force caused by the overpressure from being transmitted to the floating body 10, which in like manner would lead to a falsification of the measured value.

Structually the pressure holding valve, which can also be called a damping valve, is particularly simple to produce in a flow meter of the type described, as the drawing makes clear. All these measures contribute to assure an inherently sensitive measuring system which heretofore was used only for stationary applications, and now has become usable for measuring the quantity of fuel used in a moving motor vehicle.

While a preferred embodiment of the invention has been shown and described in detail, it will be readily understood and appreciated that numerous omissions, changes and additions may be made without departing from the spirit and scope of the present invention.

I claim:

1. In a flow-through meter for liquid or gaseous media including a housing having an inlet and an outlet through which the medium flows, a floating body within the housing disposed for movement from an initial position to a displaced position under the influence of a lifting force produced by an increased flow of the medium through the housing, the floating body being rigidly connected to a weight body of ferromagnetic material by a connecting rod, said weight body being located in the field of an induction coil mounted within the housing, and a restoring biasing member located between the weight body and an internal collar abutment of the housing and disposed to exert a force on the weight body counteracting the lifting force, wherein the improvement comprises:
- a damping piston located between said housing collar abutment and said biasing member;
- said damping piston having an opening through which extends said connecting rod to permit axial movement of said piston, lengthwise of said rod, from a rest position to a displaced position;
- said damping piston and said floating body each having an effective cross section surface of approximately the same area subjected to forces exerted by said medium; and
- said housing inlet being located between said floating body and said damping piston.

2. The flow-through meter as recited in claim 1 wherein said biasing member comprises a helical spring so dimensioned that the force exerted by it on the damping piston when the floating body is in its initial position corresponds to the weight of the damping piston.

3. The flow-through meter as recited in claim 2 wherein said weight body and said damping piston have oppositely facing recess for receiving and centering said spring therebetween.

4. The flow-through meter as recited in claim 3 wherein said weight body and said damping piston are of cup-shaped configuration, the open end of said cups defining said recesses.

5. The flow-through meter as recited in claims 1 or 4 wherein said housing collar abutment has an opening through which extends said connecting rod, said abutment further having a recessed lip for receiving said damping piston in its rest position and centering said piston with its opening aligned with said connecting rod; the openings in said abutment and said piston being substantially larger than the cross section dimension of said rod.

6. The flow-through meter as recited in claim 1 wherein said floating body is cone-shaped having a base portion constituting an impact plate during flow of the media through said housing; said cone tapering in the direction of said flow.

7. The flow-through meter as recited in claim 1 wherein said floating body includes a cylindrically shaped base portion constituting an impact plate during flow of the media through said housing; said floating body further including a cone-shaped portion mounted on said base portion and tapering in the direction of said flow.

8. The flow-through meter as recited in claim 6 or 7 wherein said floating body further includes an elongated cylindrical portion interconnecting the base portion of said floating body with said connecting rod, the length of said interconnecting cylindrical portion being substantially greater than its diameter.

9. The flow-through meter as recited in claim 1 wherein said housing further includes a discharge nipple, and said meter further includes a damping valve located between said floating body and said discharge nipple.

10. In a flow meter for liquid or gaseous media including a housing having an inlet and an outlet through which the medium flows and a discharge nipple, a floating body within the housing disposed for movement from an initial position to a displaced position under the influence of a lifting force produced by an increased flow of the medium through the housing, the floating body being rigidly connected to a weight body of ferromagnetic material by a connecting rod, said weight body being located in a field of an induction coil mounted within the housing, wherein the improvement comprises:
- a damping valve located between said floating body and said discharge nipple;
- said housing having a tapered extension made of non-ferro-magnetic material, said induction coil being mounted onto said extension; and
- a metallic shielding member mounted on said extension and over said coil;
- said induction coil being sandwiched between said housing extension and said shielding member and terminating short of the ends thereof to form an open annular space between said extension and said shielding member; and
- said space being filled with an insulating casting material.

11. The flow meter as recited in claim 9 or 10 wherein said housing has a valve seat adjacent its outlet end; said damping valve including a valve plate disposed for movement from a seated position to a displaced position relative to said valve seat, and further including a helical spring disposed between said valve plate and said discharge nipple and exerting a force on said plate in the direction of said valve seat and counter to said flow.

12. The flow meter as recited in claim 1, 2 or 10 further comprising an adjusting member of ferromagnetic material adjustably positioned within said housing in the field of said induction coil.

13. The flow meter as recited in claim 12 wherein said housing includes a passageway sized to receive said weight body; a closure member for said passageway; and said adjusting member being adjustably positioned within said closure member and in axial alignment with said weight body.

* * * * *